Sept. 27, 1938.  A. E. CHRISTENSON  2,131,616
ENGINE
Filed Jan. 19, 1937  2 Sheets-Sheet 1

Anton E. Christenson
INVENTOR
BY Victor J. Evans & Co.
ATTORNEYS

WITNESS

Sept. 27, 1938.   A. E. CHRISTENSON   2,131,616
ENGINE
Filed Jan. 19, 1937    2 Sheets-Sheet 2
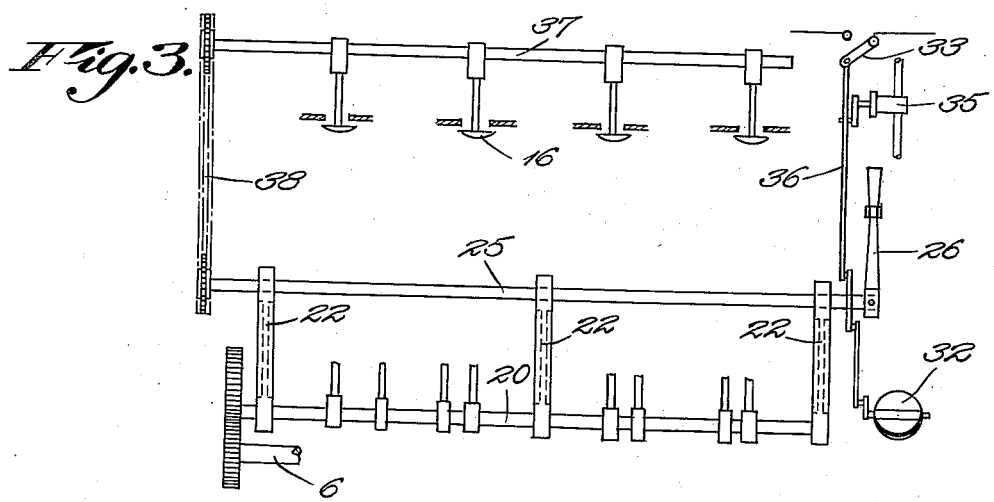
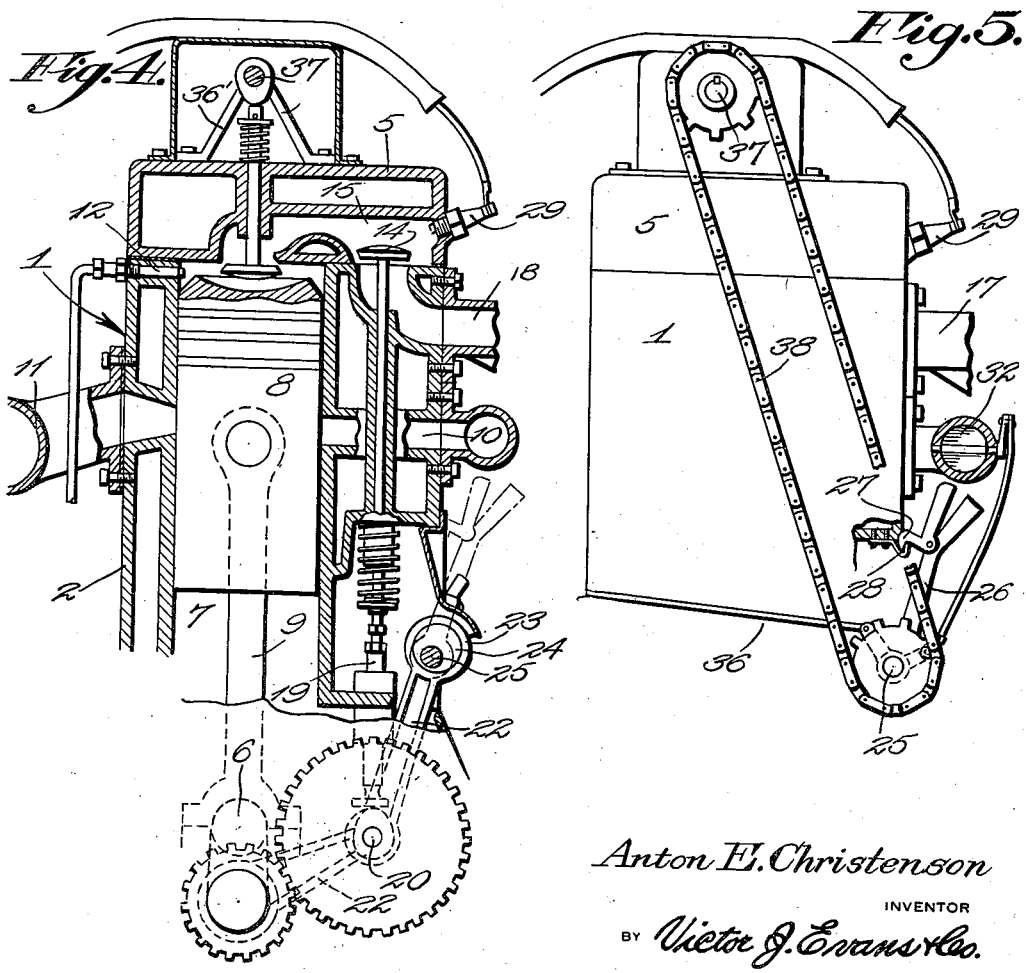
Anton E. Christenson
INVENTOR
BY Victor J. Evans & Co.
ATTORNEYS Patented Sept. 27, 1938

2,131,616

UNITED STATES PATENT OFFICE 2,131,616

ENGINE

Anton E. Christenson, Rye, Colo.

Application January 19, 1937, Serial No. 121,360

1 Claim. (Cl. 123—21)

This invention relates to engines of the two cycle Diesel type, and has for the primary object the provision of a device of this character which may be easily and quickly converted into a four cycle operation, and to employ gasoline or similar volatile fuel so that the engine may be easily and quickly started, and similar to the starting of an ordinary gasoline engine, and which may be returned to the Diesel operation without stopping the engine, and after the latter has run for a period of time sufficient to assure its successful operation by the Diesel principle.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 3 is a diagrammatical view illustrating a control for changing the cycle operation of the engine.

Figure 4 is a fragmentary transverse sectional view showing means for rendering the intake and exhaust valves of the engine operative and inoperative.

Figure 5 is a fragmentary end elevation showing means for opening and closing the compression release valve of the engine.

Figures 1, 2:
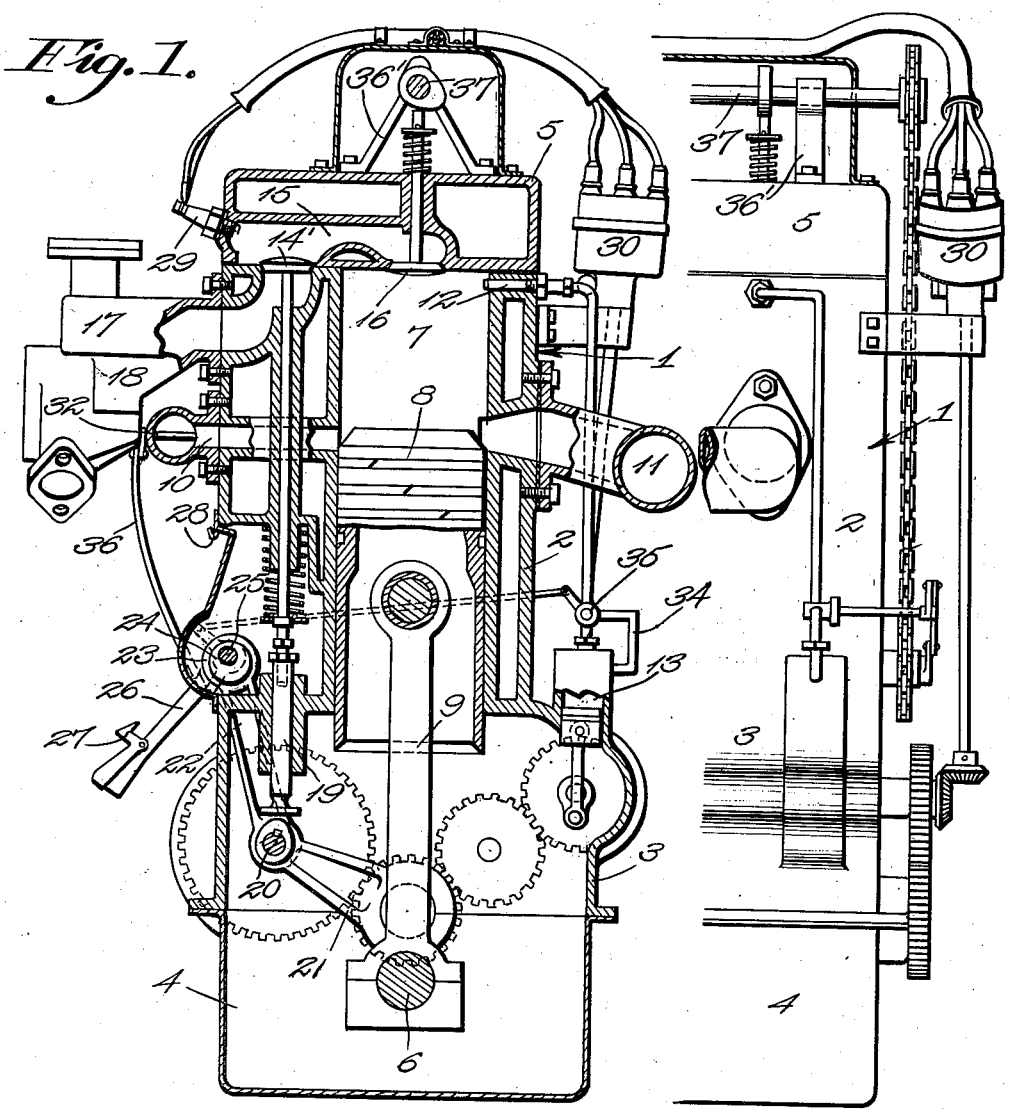
Figure 1 is a transverse sectional view illustrating an engine constructed in accordance with my invention.
Figure 2 is a fragmentary side elevation illustrating the same.
Figure 6:
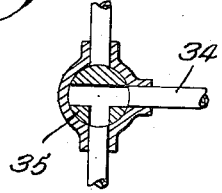
Figure 6 is a detail sectional view illustrating a fuel controlled valve occupying one of its positions.
Figure 7:
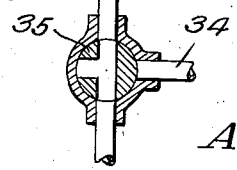
Figure 7 is a detail sectional view illustrating said fuel controlled valve in another of its positions.

Referring in detail to the drawings, the numeral 1 indicates in entirety an internal combustion engine of the two cycle Diesel type, the views of the drawings showing in detail only one cylinder of the engine, and the parts associated with said cylinder except Figure 3 which discloses that the engine can be of the multi-cylinder type as well. The engine 1 includes the cylinder block 2 mounted on a base 3 having a removable crank case 4. The block 2 carries a removable head 5 for closing the cylinder. The crank shaft is indicated by the character 6, and the piston operating in the cylinder 7 by the character 8. The piston is connected to the crank shaft 6 by a connecting rod 9. The cylinder below the upper end thereof has an air intake manifold 10, and an exhaust manifold 11. The air intake manifold and exhaust manifold are open to the cylinder when the piston 8 is in approximately its lowermost position. Connected with the upper end of the cylinder 7 is an injector 12 connected to a fuel pump 13, and the latter is geared to the crank shaft. The foregoing description briefly describes the construction involved in a two cycle Diesel engine, and which utilizes a low grade of fuel for its operation. Engines of this character are rather hard to start, but capable of providing efficient results after started, and with a low maintenance cost. In order to render an engine of this character easy to start or to start similarly to an ordinary gasoline engine, said engine is constructed in such a way that it can be made to operate on a four cycle principle and from gasoline or similar volatile fuel, so that when starting said engine it is made to run on the four cycle principle utilizing gasoline as a fuel, and after running for a short time it is easily converted to the Diesel two cycle principle.

The cylinder 7 has intake and exhaust ports controlled by intake and exhaust valves 14 and 14', respectively. Said intake and exhaust ports communicate with an auxiliary firing chamber 15. The chamber 15 is in communication with the cylinder 7 at the upper end of the latter, and may be opened and closed to said cylinder by a valve 16. This valve is of the self-seating type. The purpose of the auxiliary chamber 15 is to reduce the compression ratio in the cylinder 7, this being desirable when converting the engine into a four cycle type and operable from gasoline. The control for the valve 16 will be hereinafter more fully described.

The exhaust ports have connected thereto an exhaust manifold 17, and the intake ports have connected thereto an intake manifold 18 which is in turn connected to a conventional type of carbureter (not shown). The valve tappets for the intake and exhaust valves are indicated by the character 19, and the cam shaft for operating said intake and exhaust valves are indicated by the character 20. The cam shaft is mounted or journaled on arms 21 mounted for pivotal movement. The cam shaft is geared to the crank shaft, and remains geared to said crank shaft during the various positions of said cam shaft. The cam shaft 20 is further supported by arms 22 provided with cam straps 23, receiving cams 24. The cams 24 are secured to an operating or control shaft 25 equipped with a hand lever 26. The hand lever has a catch 27, to engage with a keeper 28, for locking said lever in one of its positions as shown in Figures 4 and 5. The hand lever 26 when in said position, positions the cams of the cam shaft 20, to operate the intake and exhaust valves. The placing of the lever 26 in a second position as shown in Figure 1, positions the cam shaft so that the cams thereof during their rotation, will pass free of the valve lifters, consequently permitting the intake and exhaust valves to remain closed.

The auxiliary chamber 15 has a spark plug 29 connected to a conventional type of distributor 30, and the later is driven off of the crank shaft of the engine, and forms a part of the usual ignition circuit of a gasoline engine. The air intake manifold 10 has a valve 32, connected to an arm on the control shaft 25, so that said valve 32 will be opened when the engine is operating on the Diesel principle, and closed when the engine is operating on the four cycle principle, and employing gasoline as a fuel. It is to be understood that an air pump or blower of a conventional kind may be connected to the intake of the air manifold 10, for the purpose of forcing air into the cylinder 7 when the engine is operating on the Diesel principle. The air pump or blower being of a conventional kind and forms no part of the present invention, it is omitted from the illustration. The ignition circuit referred to includes a control switch 33, and the fuel pump 13 has a bypass 34, controlled by a conventional type of two-way valve 35. The switch 33 and the fuel valve 35, are operatively connected to the control shaft 25, as indicated at 36 in Figure 3, so that when the engine is operating on the four cycle principle and using gasoline as a fuel, the switch 33 will be closed, and the valve 35 positioned to bypass the fuel back to the fuel pump. When the engine is operating on the Diesel principle the switch is opened to break the circuit, and the valve 35 is positioned to close the bypass 34, and open the fuel pump 13 to the injector 12.

The head 5 of the engine has brackets 36' to support a cam shaft 37. The cam shaft is for the purpose of opening and closing the valve 16, and is operatively connected to the control shaft 25 by a sprocket chain 38.

In operation, to start the engine on gasoline, the control lever 26 is moved into the full line position as shown in Figure 5, which closes the valve 32, actuates the valve 35 to cut out the bypass and connect with the fuel pump 13, and to position the cams of the cam shaft 20 to operate the intake and exhaust valves, and to close the switch 33. The valves 16 are also moved into an open position. The engine is then rotated by the usual electric starter (not shown). The gasoline fuel is drawn into the cylinder 7 with its additional combustion chamber 15, and compressed and fired starting the engine under its own power, and after the running of the engine in this manner for a period of time sufficient to raise the temperature of the engine, the control lever 26 is moved into the full line position as in Figure 1. The lever 26 thus positioned converts the engine into a two cycle Diesel type, and which principle is well known in the art, and it is not thought necessary to describe the operation in detail. It is to be understood that when the lever 26 is moved into the full line position in Figure 1 for a two cycle Diesel engine, the intake and exhaust valves are rendered inoperative, and the valve 16 permitted to close. Also the valve 35 is positioned to admit fuel into the injector 12, and the valve 32 opened in the air intake manifold 10.

Having described the invention, I claim:

In an engine, a cylinder having a combustion chamber and exhaust ports in said cylinder, a piston operating in said cylinder and controlling said exhaust ports, a crank shaft, means connecting said piston to said crank shaft, means for operating said engine on a two stroke cycle Diesel principle including an air valve for admitting air to said combustion chamber of said cylinder, solid fuel supply injection means including a fuel chamber and control valve connected in said fuel supply for cooperation with said piston controlled exhaust ports, a four stroke cycle means connected to said cylinder whereby optional operation of the engine on a four stroke cycle principle may be had, said four stroke cycle means including an auxiliary combustion chamber connected to the combustion chamber of said cylinder, ignition means for said auxiliary combustion chamber, a valve for opening and closing said auxiliary combustion chamber to the combustion chamber of the cylinder to decrease or increase the compression ratio in said cylinder, intake and exhaust valves for said auxiliary combustion chamber, a gaseous fuel supply leading to said intake valve, a cam means driven by said crank shaft for actuating the intake and exhaust valves, a frame pivoted on said engine and movably supporting said cam means to permit positioning thereof for the operation of said intake and exhaust valves when the engine is to operate on the four stroke cycle, and for non-operation of the intake and exhaust valves when the engine is to operate on the two stroke cycle Diesel principle, an eccentric means supporting and moving said frame into its different positions, means connecting said air valve to said eccentric means, means for connecting said fuel control valve to said eccentric means, and a hand lever for actuating said eccentric means.

ANTON E. CHRISTENSON.